United States Patent

[11] 3,559,780

| [72] | Inventor | William C. Erdman |
| | | Jackson, Mich. |
| [21] | Appl. No. | 797,565 |
| [22] | Filed | Feb. 7, 1969 |
| [45] | Patented | Feb. 2, 1971 |
| [73] | Assignee | Clark Equipment Company |
| | | Buchanan, Mich. |
| | | a corporation of Delaware |

[54] TRANSMISSION SYSTEM NEUTRALIZED BY BRAKE
4 Claims, 3 Drawing Figs.

| [52] | U.S. Cl. | 192/4 |
| [51] | Int. Cl. | F16h 57/10 |
| [50] | Field of Search | 192/4A, 4R |

[56] References Cited
UNITED STATES PATENTS

| 2,917,143 | 12/1959 | Jenney | 192/4AX |
| 2,990,925 | 7/1961 | Bernotas | 192/4AX |
| 3,125,201 | 3/1964 | Fisher | 192/4AX |
| 3,313,383 | 4/1967 | Tendresse | 192/4AX |

*Primary Examiner* — Benjamin W. Wyche
*Attorneys* — Kenneth C. Witt, John C. Wiessler, Robert H. Johnson and Reginald J. Falkowski ABSTRACT: A transmission control system for interrupting power flow through a transmission when the vehicle brakes are applied and the transmission is conditioned for operation in a given speed ratio and direction including a declutch valve responsive to pressurized fluid for interrupting the supply of pressurized fluid to the direction control clutches. Pressurized fluid for engaging the first speed ratio clutch also is directed to the declutch valve via a normally closed valve which opens in response to brake actuation to cause the declutch valve to shift and interrupt the supply of pressurized fluid to the direction control clutches.

INVENTOR
WILLIAM C. ERDMAN

TRANSMISSION SYSTEM NEUTRALIZED BY BRAKE

BACKGROUND OF THE INVENTION

The field of art to which this invention relates includes fluid handling systems.

In the operation of front end loaders it frequently is desirable to run the engine at a high speed while the loader is stopped. Consequently, it is known to provide transmission control systems which automatically disengage the transmission whenever the vehicle brakes are applied. Such a control system has a disadvantage in that both the engine and the brakes cannot be used simultaneously to slow down or stop the loader. This capability is very desirable when the loader is moving down a slope, for example. Therefore, a principal object of my invention is to provide a transmission control system which disengages the transmission upon brake application only when the transmission is engaged in certain of the available speed ratios.

SUMMARY OF THE INVENTION

In carrying out my invention in a preferred embodiment there is provided a first fluid control circuit for selectively operating a plurality of speed ratio clutches for a transmission and a second fluid control circuit for operating one of the direction control clutches of the transmission. A third fluid control circuit is connected to the first and second circuits and the brakes of an associated vehicle. The third circuit includes a first valve which upon brake application places one end of the spool of a second valve in fluid communication with the first circuit. When pressurized fluid from the first circuit is supplied to the one end of the spool the second valve which is disposed in the second circuit is actuated to vent the one direction control clutch to reservoir, thereby causing the one direction control clutch to disengage.

The above and other objects, features and advantages of my invention will be more easily understood by persons skilled in the art when the detailed description is taken in conjunction with the drawing.

DESCRIPTION OF THE PREFERRED EMBODIMENT

Figure 1:
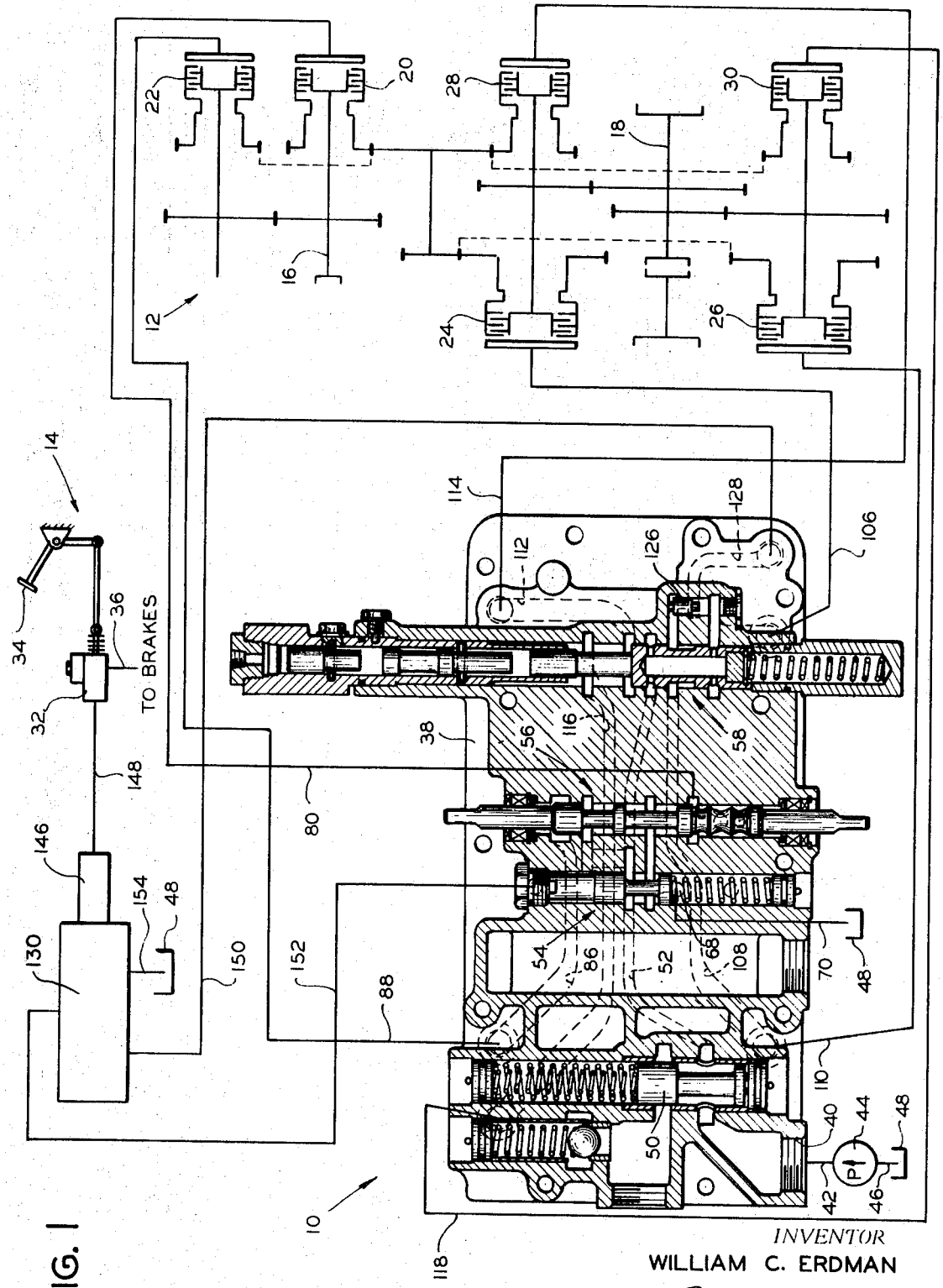
FIG. 1 shows diagrammatically and schematically my invention in conjunction with a multiple speed ratio transmission.

Referring now to FIG. 1, there is shown a transmission control system 10 in association with a multispeed ratio transmission 12 and a portion of a vehicle brake system 14.

Transmission 12 includes an input shaft 16, and output shaft 18, a fluid operated direction control clutch 20 which conditions the transmission for forward drive when engaged, a fluid operated direction control clutch 22 which conditions the transmission for reverse drive when engaged and a plurality of fluid operated speed ratio clutches 24, 26, 28 and 30 which, when engaged, condition the transmission for drive in first, second, third and fourth speed ratio, respectively. A more detailed description of a transmission of this type may be found in U.S. Pat. No. 3,126,752 issued in the name of R. H. Bolster on Mar. 31, 1964.

Brake system 14 includes a master cylinder 32 which is actuated by a foot pedal 34 to supply pressurized fluid to the vehicle brakes through a line 36.

Figure 2:
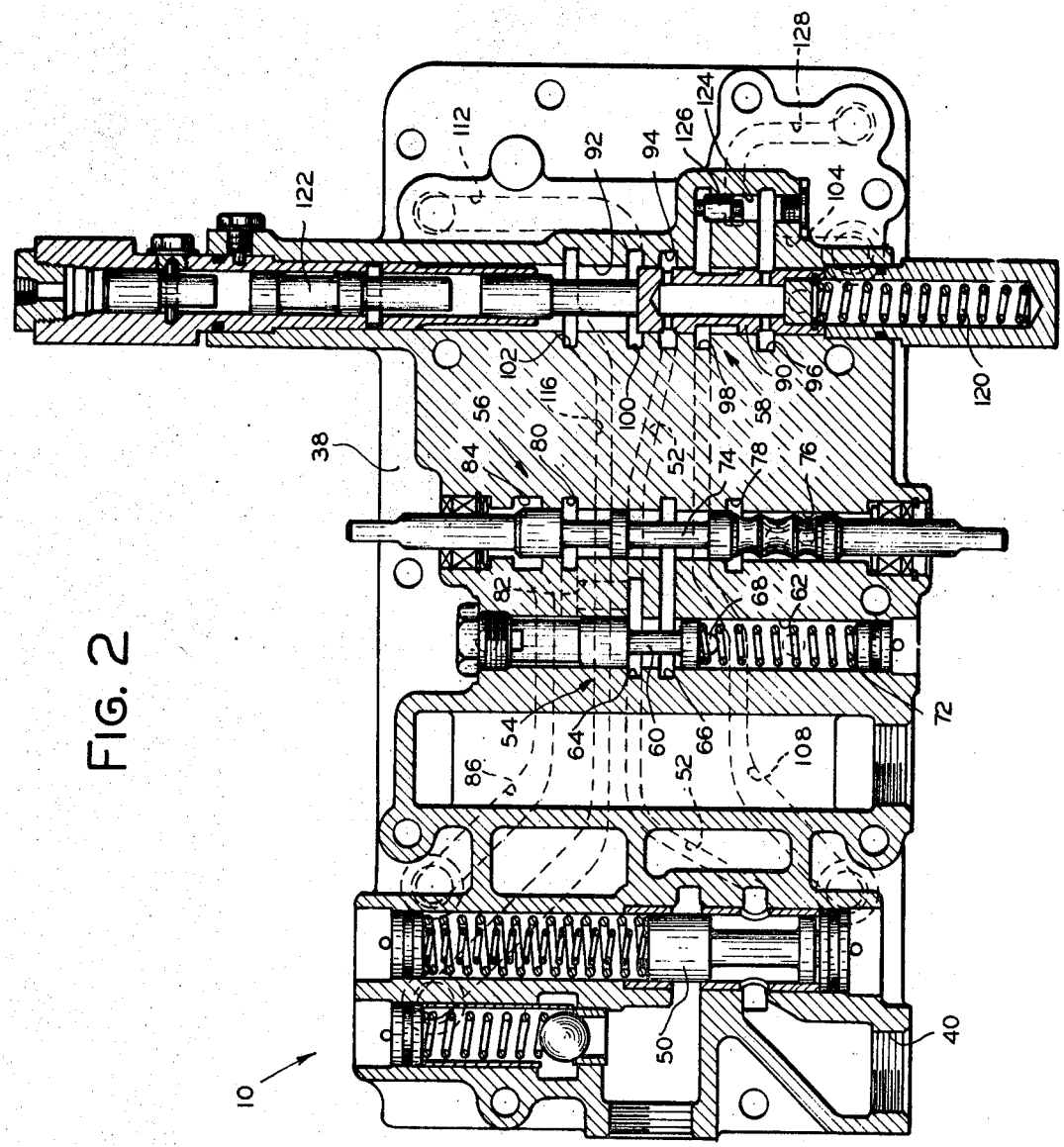
FIG. 2 is an enlargement of the control valve cover shown on FIG. 1.

Referring now also to FIG. 2, transmission control system 10 includes a control valve cover plate 38 in which a plurality of valves are disposed and includes an inlet port 40. Inlet port 40 is supplied with pressurized fluid via a conduit 42 by a pump 44 which draws fluid from a reservoir 48 via a conduit 46. Pressurized fluid supplied to inlet port 40 is directed to a conventional pressure regulating valve 50, and from regulating valve 50 to a fluid passage 52 through which pressurized fluid is supplied to a declutch valve 54, a direction control valve 56 and a speed control valve 58.

Declutch valve 54 includes a spool 60 slidably disposed in a bore 62. Located in bore 62 is a groove 64 which communicates with fluid passage 52 and longitudinally spaced from groove 64 is another groove 66 which communicates with direction control valve 56. Also located in bore 62 is a port 68 which is connected to reservoir 48 by means of a fluid passage 70. A helical spring 72 is disposed in bore 62 and normally biases spool 60 to the position shown in FIGS. 1 and 2. When spool 60 is in the position shown, pressurized fluid from passage 52 is in communication with groove 64 and fluid communication between port 68 and groove 64 is blocked so that pressurized fluid is being supplied to direction control valve 56 via groove 66. When pressurized fluid is supplied to the end of spool 60, which serves as a piston, opposite spring 72, spool 60 is actuated downwardly, as viewed in FIGS. 1 and 2, so that fluid communication between grooves 64 and 66 is blocked and groove 66 is placed in fluid communication with port 68.

Direction control valve 56 includes a spool 74 slidably disposed in a bore 76. Communicating with bore 76 is groove 66, as shown. Also disposed in bore 76 is a groove 78 which is connected by a conduit 80 to forward clutch 20. Also disposed in bore 76 is a groove 80 which is connected to groove 64 via a passage 82. Longitudinally spaced from groove 80 and disposed in bore 76 is a groove 84 which is connected via a fluid passage 86 and conduit 88 to reverse clutch 22. At this point it will be apparent that when pressurized fluid is being supplied to grooves 66 and 80 and direction control valve 56 is in the position shown in FIGS. 1 and 2 that pressurized fluid will not be directed to either the forward clutch 20 or reverse clutch 22 so that neither of these clutches will be engaged. If spool 74 of direction control valve 56 is shifted upwardly, then groove 80 is placed in fluid communication with groove 84 so that pressurized fluid will be directed to reverse clutch 22 while at the same time pressurized fluid is blocked from being directed to forward clutch 20. If spool 74 is shifted downwardly, then groove 66 is placed in fluid communication with groove 78 so that pressurized fluid from groove 66 will be directed to forward clutch 20 and at the same time pressurized fluid will be blocked from being supplied to reverse clutch 22.

It will now be apparent that should spool 60 of declutch valve 54 be actuated downwardly while forward clutch 20 is engaged that this will cause disengagement of forward clutch 20 because communication between groove 64 and groove 66 will be blocked so that pressurized fluid from passage 52 cannot be directed to forward clutch 20. At the same time groove 66 will be placed in fluid communication with port 68 which communicates with reservoir 48 so that clutch 20, if previously engaged, will be disengaged.

Speed control valve 58 includes a spool 90 slidably disposed in a bore 92. Located in bore 92 is a plurality of longitudinally spaced-apart grooves 94, 96, 98, 100 and 102. Groove 94 is connected to fluid passage 52, and so is supplied with pressurized fluid whenever pump 44 is operating. Groove 96 is connected by means of a fluid passage 104 and a fluid conduit 106 to first speed ratio clutch 24, and similarly groove 98 is connected by means of a fluid passage 108 and a conduit 110 to second speed ratio clutch 26. Groove 100 is connected by means of a fluid passage 112 and a conduit 114 to third speed ratio clutch 28 and groove 102 is connected by means of a fluid passage 116 and a conduit 118 to fourth speed ratio clutch 30. Spool 90 can be positioned in bore 92 so that pressurized fluid in groove 94 can be directed alternatively to any one of grooves 96, 98, 100 and 102 with the result that anyone of the speed ratio clutches can be engaged at any one time. Spool 90 is positioned in bore 92 through cooperation of helical spring 120 and a multiposition fluid actuator 122, the operation of which is not important to the invention, and so will not be further described.

Connecting grooves 96 and 98 is a bore 124 in which a shuttle valve 126 is slidably disposed. Also communicating with bore 124 is a fluid passage 128. Shuttle valve 126 functions so that only one of grooves 96 and 98 can be in fluid communication with fluid passage 128 at any one time. The reason for this will be explained shortly.

Figure 3:
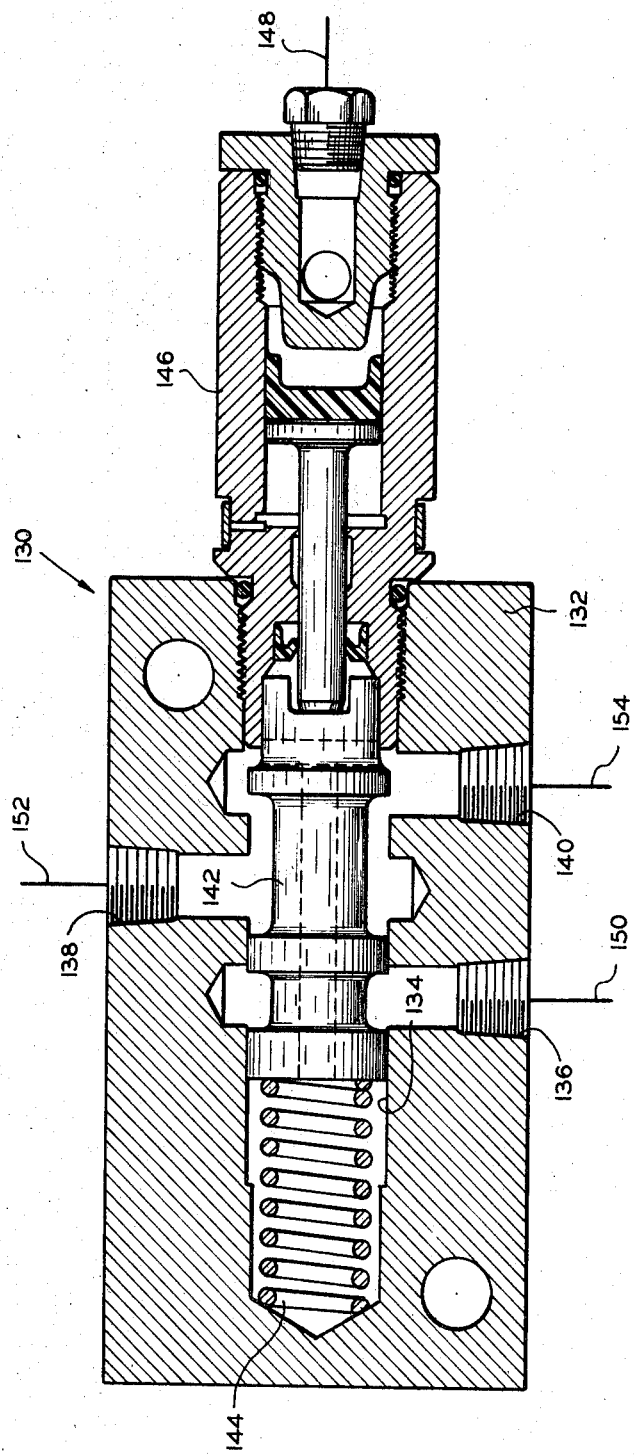
FIG. 3 is a longitudinal section of a valve embodied in the control system.

Referring now to FIGS. 1 and 3, there is shown a valve 130 which includes a body 132 with a longitudinally extending bore therein. Communicating with bore 134 are three longitudinally spaced-apart ports 136, 138 and 140. Port 136 of valve 130 is connected to fluid passage 128 by means of a conduit 150, port 138 is connected to bore 62 of declutch valve 54 at the end of spool 60, opposite spring 72, as shown, by means of a conduit 152 and port 140 is connected to reservoir 48 by means of a conduit 154. Slidably disposed in bore 134 is a spool 142 which normally is biased to the position shown by means of a helical spring 144 and is movable toward the left by means of a piston and cylinder type fluid actuator 146. With spool 142 disposed in the position shown in FIG. 3 ports 138 and 140 are in fluid communication and fluid communication between ports 138 and 136 is blocked. When spool 142 is shifted to the left ports 136 and 138 are placed in fluid communication and fluid communication between ports 138 and 140 is blocked.

Fluid actuator 146 is connected to master cylinder 32 of brake system 14 by means of a conduit 148 so that application of brake system 14 causes spool 142 to shift to the leftward position.

In order to aid persons skilled in the art to better understand my invention, I will now explain the operation of it. It will be assumed that transmission control system 10, transmission 12 and brake system 14 are all associated with a vehicle, such as a front end loader and that the driver has the vehicle conditioned for operation in first speed forward. Thus, spool 74 of direction control valve 56 will be shifted downwardly so that groove 66 is placed in fluid communication with groove 78, thereby supplying pressurized fluid to forward clutch 20 so that it will be engaged. Also, spool 90 of speed control valve 58 will be disposed as shown in FIGS. 1 and 2 so that groove 94 is in fluid communication with groove 96, whereby pressurized fluid will be supplied to first speed ratio clutch 24 so that it will be engaged. Now, if the operator desires to stop the vehicle while at the same time operating the engine at a high rate of speed it is only necessary to depress brake pedal 34 to apply the vehicle brake system 14 with the result that at the same time pressurized fluid is conveyed through conduit 148 to actuator 146 to cause spool 142 to shift to the left, as viewed in FIG. 3. When this occurs port 136 is placed in fluid communication with port 138 so that pressurized fluid from groove 96 can be supplied through fluid passage 128 and conduit 150 to port 136 and hence to bore 62 of declutch valve 54 via port 138 and conduit 152 with the result that spool 60 is shifted downwardly from the position shown to a position in which communication between grooves 64 and 66 is blocked and groove 66 is placed in fluid communication with port 68 which communicates with reservoir 48 via passage 70. As a result of the downward movement of spool 60 pressurized fluid is no longer being supplied to forward clutch 20, and since it is placed in fluid communication with reservoir 48 the clutch will disengage.

If the operator has transmission 12 conditioned for forward drive in second speed ratio, that is with clutch 26 engaged, the same disengagement of forward clutch 20 will occur upon application of brake system 14 because pressurized fluid will be supplied from groove 98 via shuttle valve 126 to passage 128 and hence via conduit 150 to port 136.

At this point it should be clear that when transmission 12 is being used in first and second forward speed ratios, which are the ratios normally used in front end loader operations that involve frequent operation of the engine at a high speed with the vehicle stopped, that brake application will cause disengagement of the transmission.

On the other hand, when transmission 12 is conditioned for drive in third or fourth gear so that speed ratio clutches 28 and 30 are engaged, then application of brake system 14 does not cause disengagement of transmission 12 because while conduit 150 would be placed in fluid communication with conduit 152 when spool 142 of valve 130 is shifted to the left upon brake actuation there is no pressurized fluid being supplied to conduit 150. As a result there is no actuation of declutch valve 54. Thus, when the associated vehicle is being driven down a slope, for example, in third or fourth gear and it is desired to slow down the vehicle the operator can brake the vehicle simultaneously with both brake system 14 and the back compression of the engine by closing down the throttle.

Although transmission control system 10 has been described to disconnect transmission 12 upon brake actuation when either first or second speed ratio clutches 24 and 26 are engaged and forward direction control clutch 20 is engaged, any number of the speed ratio clutches can be connected to conduit 150, thereby to cause disengagement of the transmission upon brake actuation. Further, by connecting passage 82 to groove 66 instead of groove 64 the transmission control system 10 will function to disconnect transmission 12 regardless of whether forward clutch 20 or reverse clutch 22 is engaged.

The above detailed description is intended to be illustrative only, and as has already been pointed out various modifications and changes can be made in my invention without departing from the spirit and scope of it. Consequently, the limits of my invention should be determined from the following claims.

I claim:

1. For use with a vehicle having brakes and a transmission with separate clutches for selecting a plurality of speed ratios, forward drive and reverse drive, a transmission control system comprising first means energizable to engage at least one of the speed ratio clutches, second means for engaging at least one of the drive clutches, and third means connected to the said first and second means and the brakes which is operable to disengage the one drive clutch when the brakes are applied and said first means is energized and inoperable to disengage the one drive clutch when the brakes are applied and said first means is not energized.

2. For use with a vehicle having brakes and a transmission with separate fluid operated clutches for selecting a plurality of speed ratios, forward drive and reverse drive, a transmission control system comprising a source of pressurized fluid, a fluid reservoir, first means connected to the said source and a first one of the ratio clutches and energizable to engage the first ratio clutch, second means connected to the said source and one of the drive clutches for operating the one drive clutch and third means connected to the said first and second means and responsive to brake operation and which is operable to disengage the one drive clutch when the brakes are applied and said first means is energized and inoperable to disengage the one drive clutch when the brakes are applied and said first means is not energized.

3. A transmission control system as set forth in claim 2 wherein the said third means includes a first valve connected to the said source and reservoir, the said first valve normally being biased to a first position for supplying pressurized fluid to the one drive clutch and movable to a second position venting the one drive clutch back to reservoir, the said first valve including piston means operable to move the said first valve to the said second position when pressurized fluid is supplied thereto, and a second valve connected to the said piston means, the brakes, the said reservoir and the said first means, the said second valve being normally biased to a third position in which the said piston means is vented back to the said reservoir and movable upon brake application to a fourth position in which the said piston means is placed in fluid communication with the said first means.

4. A transmission control system as set forth in claim 2 wherein the said first means is connected to first and second ones of the ratio clutches and includes a first fluid passage connected to the first ratio clutch, a second fluid passage connected to the second ratio clutch, a control valve connected to the said first and second fluid passages for selectively supplying pressurized fluid to the said passages and a shuttle valve connected to the said first and second fluid passages and the said third means, the said shuttle valve being operable to place in fluid communication with the said third means whichever one of the said fluid passages is being supplied with pressurized fluid.